United States Patent
Brannan (10) Patent No.: US 9,381,926 B2
(45) Date of Patent: Jul. 5, 2016

(54) RIDER CONTROLLED ZIP LINE TROLLEY BRAKE SYSTEM

(71) Applicant: Kenton Michael Brannan, Cypress, TX (US)

(72) Inventor: Kenton Michael Brannan, Cypress, TX (US)

(73) Assignee: Kenton M. Brannan, Rapid City, SD (US)

( * ) Notice: Subject to any disclaimer, the term of this patent is extended or adjusted under 35 U.S.C. 154(b) by 0 days.

(21) Appl. No.: 14/196,104

(22) Filed: Mar. 4, 2014

(65) Prior Publication Data
US 2014/0311376 A1    Oct. 23, 2014

Related U.S. Application Data (60) Provisional application No. 61/773,170, filed on Mar. 6, 2013.

(51) Int. Cl.
| A63G 9/16 | (2006.01) |
| B61H 9/02 | (2006.01) |
| B61B 7/00 | (2006.01) |
| F16D 69/02 | (2006.01) |
| A62B 1/14 | (2006.01) |

(52) U.S. Cl.
CPC .. *B61H 9/02* (2013.01); *A62B 1/14* (2013.01); *B61B 7/00* (2013.01); *F16D 69/02* (2013.01)

(58) Field of Classification Search
CPC ............ B61H 9/02; A63B 7/00; B61B 10/02; B61B 12/02; B61B 12/022; B61B 12/10
USPC .......... 104/113, 53, 112, 115; 105/26.1, 148, 105/150; 472/45, 120, 123
See application file for complete search history.

(56) References Cited

U.S. PATENT DOCUMENTS

| 547,528 | A | | 10/1895 | Weaver et al. |
| 599,697 | A | | 3/1898 | Foster |
| 1,087,062 | A | | 3/1913 | Izett |
| 1,087,063 | A | | 4/1913 | Izett |
| 1,935,711 | A | * | 11/1933 | Hecox et al. .................... 182/11 |
| 3,026,816 | A | * | 3/1962 | Russo et al. .................. 104/113 |
| 3,192,872 | A | | 7/1965 | Parent |
| 4,442,918 | A | | 4/1984 | Rhoads, Sr. |
| 4,948,118 | A | | 8/1990 | Miraglia |
| 5,094,171 | A | * | 3/1992 | Fujita ............................ 104/115 |
| 5,113,768 | A | * | 5/1992 | Brown .......................... 104/112 |
| 5,224,426 | A | | 7/1993 | Rodnunsky et al. |
| 5,931,100 | A | | 8/1999 | Sutton |
| 7,381,137 | B2 | | 6/2008 | Steele et al. |
| 7,966,941 | B1 | * | 6/2011 | Brannan ....................... 104/113 |
| 8,336,463 | B2 | | 12/2012 | Smith |
| 8,424,460 | B2 | | 4/2013 | Lerner |
| 8,601,951 | B2 | * | 12/2013 | Lerner .......................... 105/150 |
| 2002/0162477 | A1 | | 11/2002 | Palumbo |
| 2009/0255436 | A1 | | 10/2009 | Buckman |

(Continued)

Primary Examiner — William Gilbert (57) ABSTRACT

An improved zip line trolley allowing a rider control of his or her speed while traversing along a suspended cable. The trolley comprises front and back wheels conjoined via left and right trolley plates and a handle bar. Front and back hand brake levers are mounted onto the handle bar. When front and back hand brake levers are squeezed by the rider, they create a constricting force which applies friction to the suspended cable via brake pads. This frictional force slows the rider's speed to his or her desired rate and brings the rider to a safe stop at a precise location along the suspended cable. The rider is able to quickly and easily remove the trolley from the suspended cable and transport it to another.

1 Claim, 4 Drawing Sheets

(56) References Cited

U.S. PATENT DOCUMENTS

2011/0239898 A1* 10/2011 Brown ............................ 105/150
2012/0137924 A1* 6/2012 Boren et al. ................... 105/150
2013/0118842 A1 5/2013 Lerner
2013/0220743 A1 8/2013 Headings
2013/0327242 A1 12/2013 Bernier

* cited by examiner

RIDER CONTROLLED ZIP LINE TROLLEY BRAKE SYSTEM

CROSS-REFERENCE TO RELATED APPLICATIONS

This application claims the benefit of provisional patent application Ser. No. 61/773,170 filed 2013 Mar. 6 by the present inventor.

FEDERALLY SPONSORED RESEARCH

Not Applicable

REFERENCE TO SEQUENCE LISTING

Not Applicable

BACKGROUND

1. Field

This application relates to suspended cable transport systems commonly known as zip lines. More specifically, this application relates to trolleys for zip line or other suspended cable systems which allow riders to maintain control of their speed of descent while traversing along a suspended cable.

2. Prior Art

Common zip lines are thrill-ride systems predominantly utilized in applications for amusement. A common zip line system includes a suspended cable (constructed of aluminum, steel or similar metallic material) stretched between, and rigidly affixed to, separate supporting structures. One end of the suspended cable is affixed to a support structure which is located at an elevation higher than that of the opposite end. The result is a downward slope of the suspended cable. The higher end of the suspended cable is referred to as the beginning-end, and the lower end is referred to as the ending-end.

A common zip line trolley consists of either one or two pulleys affixed to a common pulley housing. A common zip line ride consists of a rider placing a common zip line trolley on top of a suspended cable at the beginning-end. The pulleys of the trolley are placed on top of the suspended cable and a rider holds on to, or is tethered to, the trolley via a conventional safety harness. The downward slope of the suspended cable facilitates a gravitational force which propels the trolley and rider along the suspended cable. The ride begins when the rider disembarks from the beginning-end traversing along the suspended cable. The ride is complete upon the rider reaching the ending-end.

Zip lines are used by individuals at their own personal locations as well as by businesses in commercial applications. Many commercial zip line courses employ the use of multiple suspended cables allowing for a variety of rides for patrons. Common zip line trolleys are most often constructed of steel, or similar rigid material. Unfortunately, they do not afford a rider the ability to control his or her speed of descent while traversing along the suspended cable. Devices and systems similar to zip lines are witnessed within the oil industry relating to lowering endangered personnel from oil derrick towers.

Zip line riders can be classified as one of two types. Type one, commonly referred to as a novice or beginner, typically has minimal experience with zip lines and is apprehensive about riding one. Novices often prefer to traverse along the suspended cable at a relatively slow speed. Type two, commonly referred to as a daredevil, is an experienced zip line rider seeking the ultimate thrill, normally through traversing along the suspended cable at a rapid speed.

Various types of braking systems for common zip lines are known within the art. The most common methods of zip line braking systems presently available include gravity braking, impact braking and frictional braking. None of the braking systems presently available for common zip lines allow a rider control of his or her speed in a safe, economical and easy-to-use manner.

A gravity braking method relies on the natural sag in the suspended cable coupled with the rider's weight to bring he or she to a stop. The ride ends at a point where the rider's momentum ceases to propel the rider along the suspended cable. Most common zip lines designed with this braking method are capable of utilizing slightly more than half of the suspended cable. Additionally, this method of bringing riders to a stop is imprecise and unpredictable in that riders of different weight will each develop a different momentum. As a result, each rider may stop at a different location along the suspended cable. This can complicate and add expense to the manner in which a zip line course designer designs the means for riders to disembark the suspended cable. An additional problem with this braking method is the rider has no control of his or her speed while traversing along the suspended cable. As a result, riders may accelerate to a velocity beyond their comfort level.

Impact braking methods commonly utilize an elastic cord (often a bungee cord or other similar material) along with a small block. The block is affixed close to the ending-end and in a manner such that it can slide freely along the suspended cable. One end of the bungee cord is fastened to the block and the other end is rigidly affixed to a point on the ground. When a rider traversing along the suspended cable makes contact with the block, the bungee cord expands and brings the rider to a stop. Riders can often be slowed to a stop at a rapid deceleration rate and then be snatched backwards along the suspended cable. This is due to the springing function of the elastic cord and is referred to as the "whip-lash effect". It is an undesirable and potentially unsafe function typical of such an impact braking method. Riders will each have a particular momentum due to their own weight. This will cause the elastic cord to respond differently for each rider. Similar to gravity braking methods, impact braking methods are also unpredictable and often do not allow for full utilization of the suspended cable. Furthermore, riders have no control of their velocity while traversing along the suspended cable.

In addition to elastic cords, rubber tires affixed to the ending-end of a suspended cable are often used as an impact braking method. Rubber tires witness similar results and potential safety hazards as those experienced with elastic cords.

Another method of impact braking includes a person standing on the ground near the ending-end of the suspended cable. This person, known as a brakeman, holds a rope or elastic cord which is attached to a block that can slide along the suspended cable. As the rider intercepts the block, the brakeman restricts the rope's motion, thus slowing the rider, often abruptly. This is another imprecise and unpredictable braking method which can be unsafe for both rider and brakeman. Furthermore, employment of a brakeman is an added expense to a commercial zip line system.

Frictional braking can be the most dangerous among the common zip line braking methods. One form of frictional braking requires the rider to wear a glove. While traversing along the suspended cable, the rider squeezes the suspended cable with the hand wearing the glove. This creates dynamic friction along the suspended cable, thus slowing the rider. This can be dangerous in that the rider can wear a hole through the glove and rub his or her skin along the suspended cable. Another form of frictional braking requires the rider to drag his or her feet along the ground while approaching the ending-end. Both of these methods are unpredictable and dangerous as bodily harm can easily be experienced.

Other braking methods known within the art add considerable expense and complexity to a common zip line. Many methods are rigidly fixed to a particular suspended cable, thus they are not easily transportable to others. They often include a complicated series of additional pulleys and cables which all must work in unison to be fully operational. Should any one piece of such a braking method malfunction, the entire system and rider's safety may be jeopardized.

With regards to common zip line trolleys, most utilize a single point of connection between the trolley and the rider's safety harness. A typical safety harness is normally made of nylon or other safety fabric. A fabric harness, coupled with a single point of connection to the trolley, creates the likelihood a rider's position will twist while traversing along the suspended cable. Often times the rider may be facing sideways or even backwards during the ride due to this twisting effect. This can pose a serious safety hazard since a rider's feet may no longer be facing forward. Common zip line trolleys and safety harnesses allowing riders to twist can be especially dangerous for a zip line system which relies upon riders using their feet to facilitate braking. For these systems, it is imperative for riders to have both feet facing forward and be ready to land accordingly at the end of the ride.

US Patent Application Publication 20110239898 to Brown describes a zip line system kit comprising a trolley of dual frame pieces, an adjustable length seat, a handle assembly and a braking mechanism. The handle assembly is rigidly affixed to the aforementioned dual frame pieces. One particular embodiment of Brown's device includes a small actuator for activating the aforementioned braking mechanism. This braking mechanism is complicated and elaborate in that it includes a series of mechanical interlocks and springs such to provide functionality for riders to either engage or dis-engage the actuator for decreasing velocity. In addition, this braking mechanism as described prevents the ability to quickly and easily remove the trolley from a suspended cable. Furthermore, Brown's device is used in conjunction with a bumper and shock cords or other force absorbing material in order to facilitate speed control. Brown's device is described as a kit system requiring users to mix and match a multitude of features to achieve intended operation.

U.S. Pat. No. 7,966,941 to Brannan describes a trolley intended for use on a suspended cable or zip line. This trolley comprises dual pulleys conjoined via a common housing. In addition, this trolley comprises a handle including hand brake levers. When the rider squeezes the hand brake levers, a frictional force is applied via brake pads directly to the pulleys.

U.S. Pat. Nos. 7,637,213 and 7,404,360 and US Patent Application Publication 20100162917 to Cylvick describe a trolley intended for use on a suspended cable or zip line. This trolley comprises a single pulley with a series of brake pad segments which apply dynamic frictional forces to the suspended cable. One particular embodiment of Cylvick's device relies predominantly upon the weight of the rider for speed control. Once the rider's weight is determined, the trolley is adjusted accordingly prior to the rider embarking upon a ride. Another embodiment of Cylvick's device does allow for a rider to pull a tether while traversing along the suspended cable. This tether operates in conjunction with, and is dependent upon, the rider's weight. The rider pulls the tether which counteracts the effect of the rider's weight on the braking mechanism. Thus, a rider is able to achieve a minimal degree of speed control during the ride. Cylvick's braking mechanism on this trolley utilizes a series of brake pad segments to provide the frictional braking force which is applied to the suspended cable. Replacement of these brake pads can be difficult in that the entire brake assembly must be detached from the trolley and disassembled. Furthermore, this particular trolley can be cumbersome to remove from the suspended cable. It does not afford itself to quick and easy switching among different suspended cables.

U.S. Pat. No. 6,622,634 to Cylvick describes a trolley intended for use on a suspended cable or zip line. This trolley comprises a single pulley with a brake pad which applies frictional forces to the suspended cable. The speed of descent for this device is predetermined and preset based upon the elevation difference between the support structures. Thus, riders of different weights will traverse along the suspended cable at approximately the same speed. However, riders have no control of their speed for the duration of the ride. The braking mechanism of this apparatus also employs a V-shaped trap which assists in applying additional dynamic friction directly to the suspended cable. This trolley can be complicated to remove from the suspended cable in that partial disassembly is required.

U.S. Pat. No. 6,666,773 to Richardson describes a zip line system which applies a frictional force to the suspended cable. The rider's speed of descent is predetermined based upon the rider's weight and does not afford speed control to the rider during the ride. The braking mechanism of this apparatus also employs a V-shaped trap which assists in applying additional dynamic friction directly to the suspended cable.

US Patent Application Publication 20080202375 to Quattlebaum describes a self-driven cable transportation system. Quattlebaum's device is propelled by effort from the rider's feet, unlike a zip line which utilizes gravitational forces to propel riders. The braking system is described vaguely and provides no specifics. It is possible that the intent is to apply dynamic frictional forces in a multitude of fashions. In continuation, Quattlebaum's device could include a braking mechanism such as a wheel cylinder piston, air shock, nitrogen shock, hydraulic disc brake, magnetic disc brake, dynamic brake or shoe brake. These options could be applied in a multitude of manners and thus are significantly different than the rider controlled zip line trolley brake system.

U.S. Pat. No. 5,113,768 to Brown describes a cable car to be used for videography. The brake is applied via a foot pedal and includes a slip-ring collar and other related complicated apparatus. This system is different from the rider controlled zip line trolley brake system as it is foot-actuated and is not intended for thrill-ride or recreational use.

U.S. Pat. No. 4,934,277 to Smith et al. describes an apparatus designed for the safe recovery of individuals stranded upon suspended cables such as ski lifts. A brake shoe is applied directly to the suspended cable and the force applied is dependent upon the rescuer's weight and a predetermined adjustment of the described lever arm. This adjustment must be predetermined and applied prior to the rescuer descending along the suspended cable. The design of this apparatus affords itself to a slow-moving rescue device and not necessarily for a rapid moving recreational zip line trolley.

U.S. Pat. No. 575,528 to Smallwood illustrates a trollocipede with a braking system. However, Smallwood's braking system is applied to the wheel. This is contrary to the rider controlled zip line trolley brake system which applies frictional forces to the suspended cable. Smallwood's device is not intended, or practical for use on a modern zip line system.

U.S. Pat. No. 301,923 to Reisdorff describes a fire escape device used in conjunction with a suspended rope strung from the top of a burning building. The device utilizes a single pulley and the braking mechanism comprises two separate components. The first is a series of outwardly projecting spurs or barbs which embed into the rope to retard the speed of descent. The second is a lever which allows the escapee to apply a frictional force to the side of the pulley, thus further slowing the speed of descent. This device would not operate as intended if used in conjunction with a metallic suspended cable rather than a rope. The outwardly projecting spurs will not embed into a metallic suspended cable as they will with a rope. Thus, this speed-retarding feature cannot be realized on a common zip line system.

SUMMARY

In accordance with one embodiment, a zip line trolley is provided which affords a rider control of his or her speed while traversing along a suspended cable. As the rider descends along the suspended cable, he or she gently squeezes either or both of a pair of handbrakes. As a result, a dynamic frictional force is applied to the suspended cable which slows and ultimately brings the rider to a gentle stop at a precise location. Upon reaching a complete stop, riders can quickly and easily remove the trolley from the suspended cable and transport it to another.

DRAWINGS

Figures

The foregoing and other objects and features of the present trolley will become more fully apparent from the following description and appended claims, taken in conjuction with the accompanying drawings. Understanding that these drawings depict only typical embodiments of the trolley and are, therefore, not to be considered limiting of its scope, the trolley will be described with additional specificity and detail through use of the accompanying drawings in which:

DRAWINGS

Reference Numerals

8—handle bar
10—handle mounting bracket
12R—trolley right plate
12L—trolley left plate
14—harness connection
16B—back cable sleeve mounting bracket
16F—front cable sleeve mounting bracket
18B—back hand brake lever
18F—front hand brake lever
20B—back brake cable sleeve
20F—front brake cable sleeve
22B—back brake arm
22F—front brake arm
24—shoulder bolt
26B—back brake pad
28B—back wheel
28F—front wheel
30B—back wheel axle
32—wheel axle nuts
34—suspended cable

DETAILED DESCRIPTION

The trolley and associated braking mechanism will now be described with reference to the accompanying drawing figures. It is to be understood that the drawing FIGS. 1, 2, 3 and 4 are meant to be only illustrative, that they are not necessarily drawn to scale, and that some details, which would be obvious to those of ordinary skill in the art, may have been omitted in the interest of simplification and brevity.

Figure 1:
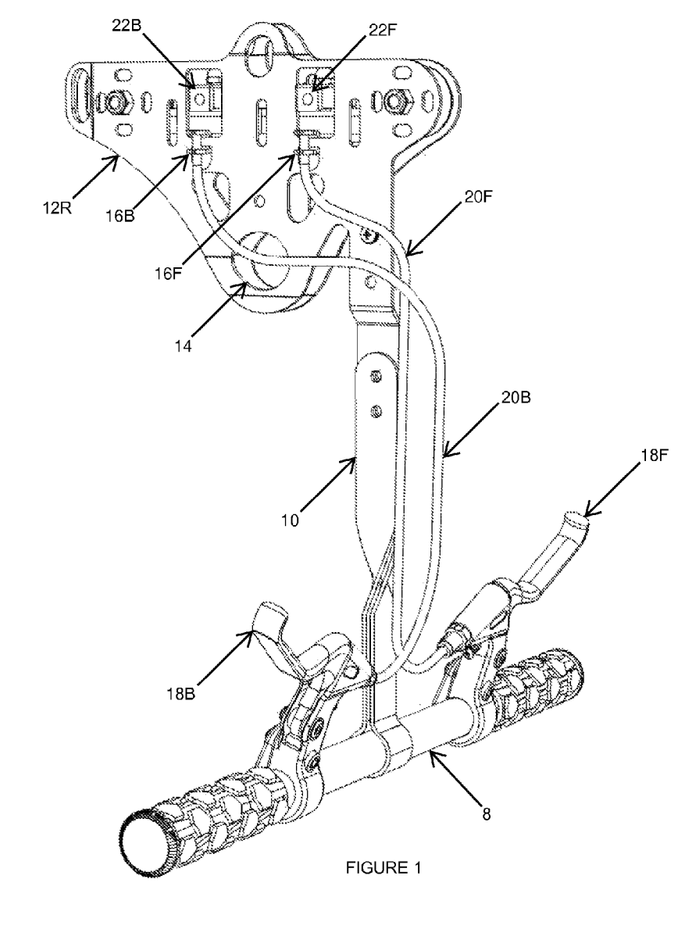
FIG. 1 is a front-right view showing the entire trolley in accordance with one embodiment.
Figure 2:
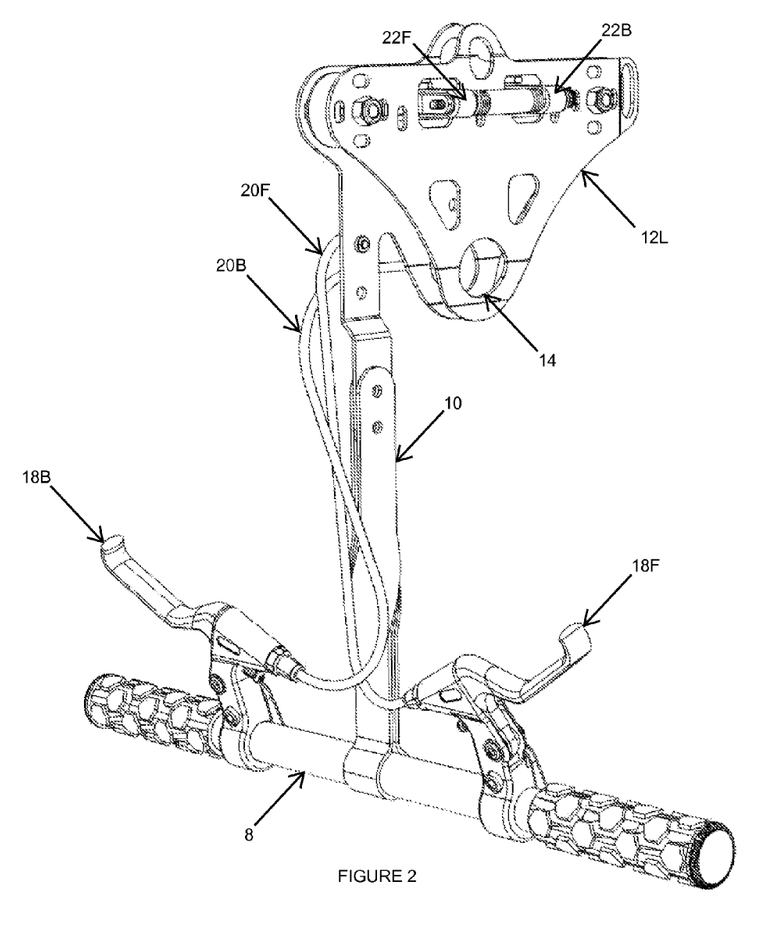
FIG. 2 is a front-left view showing the entire trolley in accordance with one embodiment.

FIGS. 1 and 2 illustrate a complete view of the rider controlled zip line trolley brake system. The trolley comprises a handle bar 8 and handle mounting bracket 10. The handle mounting bracket 10 is fastened to trolley right plate 12R via common nuts and bolts. Trolley left plate 12L is similar and opposite to trolley right plate 12R, less a connecting means for a handle. A harness connection 14 is used to secure riders via a conventional harness or similar safety device (not shown). Back cable sleeve mounting bracket 16B and front cable sleeve mounting bracket 16F are rigidly attached to trolley right plate 12R. Back hand brake lever 18B and front hand brake lever 18F are connected to handle bar 8. Back brake cable sleeve 20B connects on the bottom end to back hand brake lever 18B and to back cable sleeve mounting bracket 16B on the top end. Likewise, front brake cable sleeve 20F connects on the bottom end to front hand brake lever 18F and to front cable sleeve mounting bracket 16F on the top end. Back brake arm 22B and front brake arm 22F are mounted on one end to trolley left plate 12L and protrude through trolley right plate 12R. In the preferred embodiment, these particular items described above shall be constructed of rigid materials such as steel, aluminum or other similar material safe for supporting a rider's weight.

Figure 3:
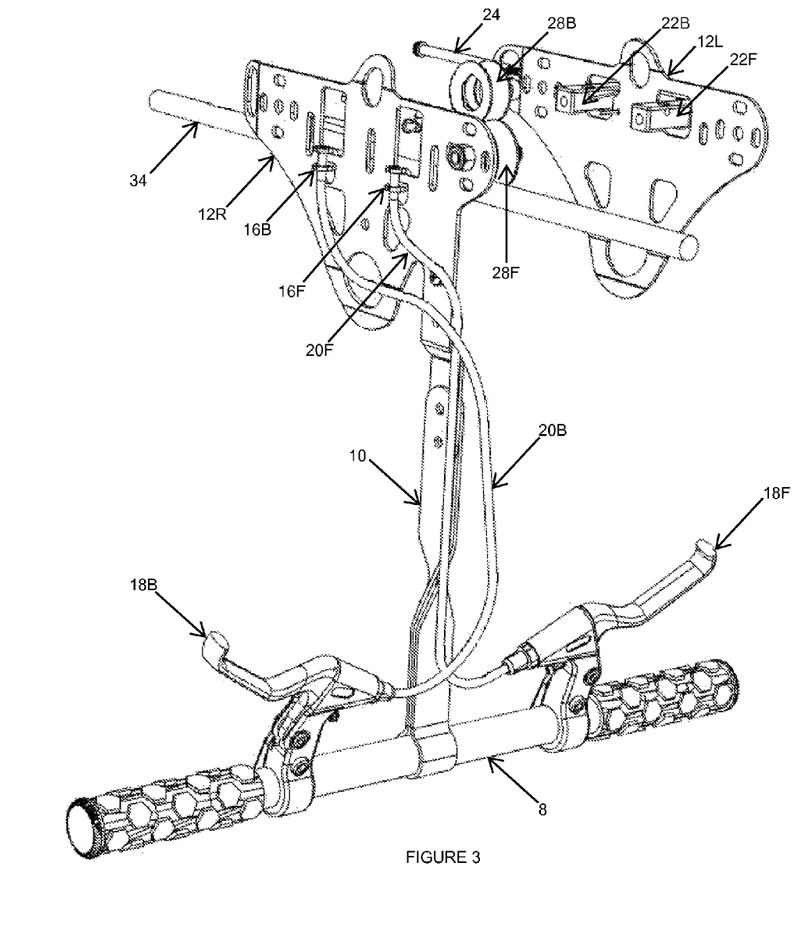
FIG. 3 is a front-right, exploded view of the trolley assembly of FIG. 1.
Figure 4:
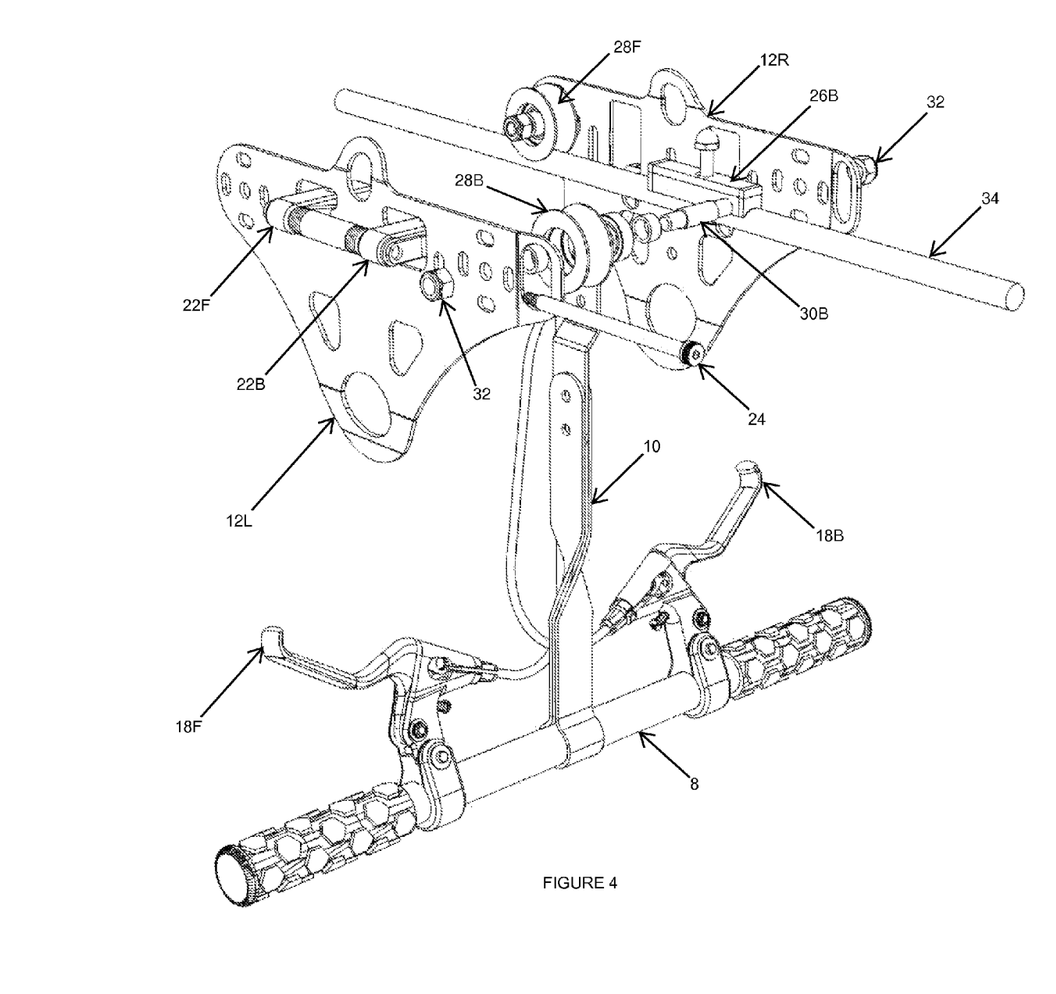
FIG. 4 is a rear-left, exploded view of the trolley assembly of FIG. 2.

Referring to the exploded views of FIGS. 3 and 4, each component can be seen along with its method of assembly. Both figures illustrate a suspended cable 34 indicative of a common zip line thrill-ride system. Back brake arm 22B and front brake arm 22F are affixed to trolley left plate 12L by a shoulder bolt 24. Back wheel 28B is affixed to both trolley right plate 12R and trolley left plate 12L via back wheel axle 30B and secured with wheel axle nuts 32. Front wheel 28F is also mounted to both trolley right plate 12R and trolley left plate 12L in a similar manner. Back brake pad 26B is positioned such to contact suspended cable 34 and mounts to back brake arm 22B. A front brake pad (not shown) is positioned in a similar manner and mounts to front brake arm 22F. While the rider controlled zip line trolley brake system is in use, front and rear wheels 28B and 28F rest atop suspended cable 34.

Operation—FIGS. 1, 2, 3, 4

The manner of using the rider controlled zip line trolley brake system is similar to other zip line trolleys. To begin, a rider (not shown) is fitted with a conventional harness or similar safety device (not shown). To utilize the rider controlled zip line trolley brake system, the rider maneuvers the mechanism around the beginning-end of suspended cable 34. Front and rear wheels 28B and 28F rest on top of suspended cable 34. The rider is then secured through harness connection 14 via a conventional quick link, carabiner or other safety latching mechanism (not shown). With the rider safely secured through harness connection 14 and the rider controlled zip line trolley brake system affixed to suspended cable 34, the rider holds on with both hands to handle bar 8. The rider then engages in a ride embarking at a downward descent along suspended cable 34. As speed increases, the rider may choose to begin slowing his or her velocity. To accomplish this, the rider will create a constricting force by squeezing front and back hand brake levers 18F and 18B. Front and back hand brake levers 18F and 18B have a continuous range of motion bound by first and last positions. The first position, or open position, correlates to a minimum constricting force. The last position, or ultimate position, correlates to a maximum constricting force. This constricting force applied to front and back hand brake levers 18F and 18B results in a similar constricting force applied to front and back brake arms 22F and 22B seen in FIGS. 1 and 2. As front and back brake arms 22F and 22B constrict, back brake pad 26B and front brake pad (not shown) will apply a dynamic frictional force directly to suspended cable 34. This frictional force will cause the rider's speed of descent to decrease. A greater constricting force applied by the rider to front and back hand brake levers 18F and 18B will result in a greater dynamic frictional force being applied to suspended cable 34. This greater constricting force will slow the rider's speed of descent at a quicker rate. Upon reaching the ending-end of suspended cable 34 and coming to a safely stopped position, the rider will release front and back hand brake levers 18F and 18B. As a result of the constricting force being released, the friction applied to suspended cable 34 is removed. The rider can then open the safety latching mechanism and remove the rider controlled zip line trolley brake system from suspended cable 34.

ADVANTAGES

Several advantages of some embodiments of this rider controlled zip line trolley brake system are seen to be:
a) Provide the rider with complete control of his or her speed of descent while traversing along a suspended cable. This will allow novices to slowly descend at a speed they are comfortable with, while also allowing daredevils to descend as rapidly as a particular zip line will allow.
b) Allows riders of any weight and thrill-seeking range, either novices or daredevils, to stop at a precise location every time, regardless if it is upon a mounted platform or small ladder.
c) Utilizes a common handbrake, similar to that of a bicycle which is easy for the rider to apply and release.
d) Can be used on a common zip line system including those with only a single suspended cable.
e) Allows the rider to quickly and easily remove the trolley from the suspended cable at the end of the ride and easily transport it to another suspended cable.
f) The brake pads, which are expressly designed to wear with use, are simple to replace.
g) Allows for utilization of the entire length of a suspended cable, unlike the typically shortened length often experienced with a gravity braking or impact braking method.
h) Prevents the "whip-lash effect" witnessed with common impact braking methods.
i) Allows zip line course designers and constructors the freedom to adjust the angle of descent of suspended cables such to maximize the enjoyment experienced from increasing speed.
j) Additional personnel are not required to facilitate braking.
k) Can easily and safely be used on different suspended cables. This braking mechanism is completely independent of a particular suspended cable.
l) The rigid handle prevents the twisting effect of the rider commonly experienced with traditional trolleys and harnessing systems. Thus, the rider can consistently approach the ending-end with both feet in a safe position.

CONCLUSION, RAMIFICATIONS AND SCOPE

Accordingly, the reader will see that at least one embodiment of this rider controlled zip line trolley brake system provides a more practical means of bringing a zip line rider to a safe stop. Zip lines are enjoyed worldwide and are utilized by many summer camps, challenge courses and amusement parks. In addition to commercial applications, zip lines are also used by individuals at their own private locations. Although relatively simple and straightforward systems, common zip lines can be dangerous if not designed, constructed and operated properly.

While creating a zip line, designers must allow for a means to bring riders to a safe stop. Many available braking methods have a host of problems in that they are either: unsafe, unreliable, unpredictable, complicated or not cost-effective for an ordinary zip line. Others risk injuring riders with an abrupt impact or other unsafe stopping method. Moreover, some methods are not transportable among multiple cables in a practical and timely manner.

Many existing braking methods do not allow riders to have any control of their speed of descent. Others require so many parts and pieces to construct that they become cost-prohibitive to be applied to common zip lines.

This rider controlled zip line trolley brake system is simple to apply to any common zip line. Any rider, regardless of weight or skill level, can safely and comfortably enjoy the thrill of a common zip line with this trolley. Riders have complete control of their deceleration rate. Furthermore, riders can consistently stop at an exact location anywhere along the suspended cable, thus allowing for a safe ride and stop. Complex factors such as rider-weight variations, pulley mechanisms and additional personnel are not necessary for this rider controlled zip line trolley brake system to perform as desired. It is designed such that the parts intended to wear-out are simple and quick to replace.

This rider controlled zip line trolley brake system allows common zip line course designers the maximum amount of flexibility in utilizing the available landscape to design a zip line course. In addition to design flexibility, the ease of portability among suspended cables for this trolley further simplifies course design and reduces construction costs. The implementation of a common hand brake lever as the means for applying the braking mechanism further makes this trolley easy and comfortable to use for any rider. Riders can enjoy a ride for the total length of the suspended cable and can also stop at a precise location of their preference. Stopping is independent of factors such as velocity which are predicated by weight and angle of descent of the suspended cable. The rigidly mounted handle allows riders to maintain their feet in a forward position during the entire duration of their ride. This prevents the unsafe twisting effect so commonly experienced with conventional trolleys and harnesses.

While the above description contains much specificity, this should not be construed as limitation on the scope, but rather as an exemplification of one preferred embodiment thereof. Many other variations are possible. For example, the above description details two sets of handbrakes and associated brake arms and pads. However, adequate braking could be achieved with only one handbrake and one brake arm and pad combination. Finally, a similar result could be achieved with the use of either a single pulley or even more than two as detailed. Accordingly, the scope should be determined not by the embodiments illustrated, but by the appended claims and their legal equivalents.

The invention claimed is:

1. A trolley for use with a suspended cable, said trolley comprising:
   a pulley housing comprising a first support plate and a second support plate, said first and second support plates each having a planar surface in substantially parallel relationship and sandwiching a first wheel and a second wheel, said wheels configured to rest on said suspended cable;
   one of said support plates having a flange extending therefrom, said flange having a first planar portion being coplanar with said planar surface of said respective support plate and a second planar portion extending in a plane that is substantially parallel and between respective coplanar planes of said first and second planar surfaces, said second planar portion terminating in a free distal end;
   a handle mounting bracket comprising a strip having a first end portion and a second end portion, said first end portion abutting a first side of said second planar portion, and said second end portion abutting a second side of said second planar portion whereby said second planar portion is between said first end portion and said second end portion and connected thereto by a first and second nut and bolt connection, said strip further forming a handle bar receiving portion, said handle mounting bracket having an approximate ninety-degree twist between said first and second end portions and said handle bar receiving portion;
   a handle bar received in said handle bar receiving portion and having a first end and a second end;
   a first handbrake lever assembly attached proximate said first end of said handle bar being connected to and configured to activate a first brake arm proximate said first wheel, and a second handbrake lever assembly proximate said second end of said handle bar being connected to and configured to active a second brake arm proximate said second wheel, said first and said second brake arms are attached to respective first and second brake pads, said brake pads being configured to directly contact said cable.

* * * * *